(12) United States Patent
Chassagne et al.

(10) Patent No.: US 12,196,504 B2
(45) Date of Patent: Jan. 14, 2025

(54) HEAT EXCHANGER COMPRISING A BAFFLE WALL WITH HOLLOW TURBULENCE GENERATORS

(71) Applicant: SAFRAN AIRCRAFT ENGINES, Paris (FR)

(72) Inventors: Amélie Argie Antoinette Chassagne, Moissy-Cramayel (FR); Antoine Robert Alain Brunet, Moissy-Cramayel (FR); Cédric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 114 days.

(21) Appl. No.: 17/756,986

(22) PCT Filed: Dec. 8, 2020

(86) PCT No.: PCT/FR2020/052335
§ 371 (c)(1),
(2) Date: Jun. 7, 2022

(87) PCT Pub. No.: WO2021/116591
PCT Pub. Date: Jun. 17, 2021

(65) Prior Publication Data
US 2022/0412675 A1    Dec. 29, 2022

(30) Foreign Application Priority Data

Dec. 12, 2019   (FR) ........................................ 1914285

(51) Int. Cl.
*F28F 13/12*     (2006.01)
*F02C 7/141*     (2006.01)

(52) U.S. Cl.
CPC .............. *F28F 13/12* (2013.01); *F02C 7/141* (2013.01); *F05D 2260/213* (2013.01); *F05D 2260/2212* (2013.01)

(58) Field of Classification Search
CPC .. F02C 7/14; F02C 7/143; F02C 7/185; F28F 13/12; F28F 2255/02; F05D 2260/213;
(Continued)

(56) References Cited

U.S. PATENT DOCUMENTS 7,604,461 B2 * 10/2009 Bonnet ................. F03D 1/0641
416/235
8,061,986 B2 * 11/2011 Xiong ..................... F03D 7/022
416/235

(Continued)

FOREIGN PATENT DOCUMENTS

CN      106767115 A  *  5/2017  ............. F28F 13/08
EP         3290846 A1      3/2018

OTHER PUBLICATIONS

Translation and Original of CN 106767115 A (Year: 2017).*
(Continued)

*Primary Examiner* — Courtney D Heinle
*Assistant Examiner* — Ryan C Clark
(74) *Attorney, Agent, or Firm* — Pearne & Gordon LLP

(57) ABSTRACT

A heat exchanger between a fluid and an air flow, includes a heat exchange wall separating the fluid and the air flow, the heat exchange wall including a heat exchange surface that extends parallel to a longitudinal direction of the air flow and with which the air flow is in contact. The heat exchange wall includes at least one turbulence generator extending in a hollow manner in relation to the heat exchange surface.

9 Claims, 3 Drawing Sheets

(58) Field of Classification Search
CPC ..... F05D 2260/2212; F05D 2260/2214; F05D 2260/221
See application file for complete search history.

(56) References Cited

U.S. PATENT DOCUMENTS

| | | | | |
|---|---|---|---|---|
| 9,845,147 | B2* | 12/2017 | Emerick | B64C 39/10 |
| 2006/0099073 | A1* | 5/2006 | Djeridane | F28F 3/044 |
| | | | | 416/97 R |
| 2012/0017605 | A1* | 1/2012 | Slabaugh | F02C 7/141 |
| | | | | 165/185 |
| 2012/0114468 | A1* | 5/2012 | Elder | F02C 7/14 |
| | | | | 415/178 |
| 2017/0159491 | A1* | 6/2017 | Hoefler | F02C 7/12 |
| 2017/0184028 | A1* | 6/2017 | Sennoun | F02C 7/224 |
| 2018/0058473 | A1* | 3/2018 | Kenworthy | F28D 1/0246 |
| 2018/0281048 | A1* | 10/2018 | Yang | F28F 1/16 |
| 2018/0328285 | A1* | 11/2018 | Tajiri | F28F 1/325 |
| 2019/0360398 | A1 | 11/2019 | Qiu et al. | |
| 2020/0370476 | A1* | 11/2020 | Olver | F02C 7/14 |
| 2021/0231057 | A1* | 7/2021 | Livebardon | F02K 1/827 |

OTHER PUBLICATIONS

International Search Report for issued in Application No. PCT/FR2020/052335 dated Apr. 15, 2021.
Written Opinion for PCT/FR2020/052335 dated Apr. 15, 2021.

* cited by examiner

HEAT EXCHANGER COMPRISING A BAFFLE WALL WITH HOLLOW TURBULENCE GENERATORS

This is the National Stage of PCT international application PCT/FR2020/052335, filed on Dec. 8, 2020 entitled "HEAT EXCHANGER COMPRISING A BAFFLE WALL WITH HOLLOW TURBULENCE GENERATORS", which claims the priority of French Patent Application No. 1914285 filed Dec. 12, 2019, both of which are incorporated herein by reference in their entireties.

TECHNICAL FIELD

The invention relates to a turbomachine such as a turbojet engine, through which at least one gas flow stream passes, this stream being delimited by an inner wall of this engine.

PRIOR ART

In such an engine, the air is admitted in an intake duct to pass through a fan including a series of rotary blades before splitting into a central primary flow and a secondary flow surrounding the primary flow.

The primary flow is compressed by compressors before reaching a combustion chamber, after which it expands by passing through turbines, before being released by generating a thrust. The secondary flow is for its part propelled directly by the fan to generate an additional thrust.

The primary flow and the secondary flow respectively circulate in a primary stream and a secondary stream separated from one another by a space called inter-stream.

The primary stream is externally delimited by an inner wall of the inter-stream space, the secondary stream is internally delimited by an outer wall of the inter-stream space and it is externally delimited by an inner wall of a nacelle surrounding the turbojet engine.

In such an engine, various components, of the bearings and other type, are lubricated by oil that circulates in a hydraulic circuit integrating a heat exchanger, in the form of a cooling radiator, ensuring that this oil remains at an adapted temperature in all circumstances. Such an exchanger is usually designated by the acronym ACOC meaning "Air Cooled Oil Cooler", that is to say cooled by air and cooling the oil.

This exchanger is fastened to a wall of the jet engine, and it protrudes from this wall to be passed through by a portion of the flow that runs along this wall by circulating in the jet engine, in such a way as to cool the oil of the hydraulic circuit.

Such an exchanger thus constitutes a relief shape that in fact constitutes an obstacle introducing pressure losses in the flow in the engine.

The aim of the invention is to propose an arrangement integrating such an exchanger that limits the pressure losses that it introduces into the flow passing through this jet engine.

DISCLOSURE OF THE INVENTION

To this end, the object of the invention is a heat exchanger between a fluid and an air flow, comprising a heat exchange wall separating the fluid and the air flow, the heat exchange wall including a heat exchange surface that extends parallel to a longitudinal direction of the air flow and with which the air flow is in contact, characterised in that it includes a baffle wall extending in the extension of the heat exchange wall and upstream of it in relation to the direction of circulation of the air flow, and in that the baffle wall includes at least one turbulence generator of hollow shape in relation to the outer surface.

The invention thus makes it possible to dispense with fins usually provided in such a heat exchanger, to obtain an optimal heat exchange efficiency while reducing the pressure loss introduced into the secondary flow by the presence of the exchanger.

To this end, another object of the invention is an exchanger thus defined, including at least one turbulence generator disposed at an upstream end of the baffle wall.

To this end, another object of the invention is an exchanger thus defined, wherein the baffle wall includes a plurality of turbulence generators distributed in at least one direction perpendicular to the longitudinal direction.

To this end, another object of the invention is an exchanger thus defined, including at least two adjacent turbulence generators having different shapes and/or dimensions.

To this end, another object of the invention is an exchanger thus defined, wherein at least one turbulence generator has a variable geometry in relation to the outer surface, between a deactivated state wherein it is flush with the outer surface so as not to generate turbulences, and an activated state wherein it forms a hollow in relation to the outer surface to generate turbulences.

To this end, another object of the invention is an exchanger thus defined, wherein the heat exchange wall includes inner cavities opening towards the outer surface and each corresponding to a turbulence generator, the outer surface including a sealed flexible membrane, the activation of a turbulence generator being obtained by depressurising the corresponding inner cavity.

To this end, another object of the invention is an exchanger thus defined, integrating a system for controlling the activated or deactivated state of the turbulence generators in relation to the outer surface.

To this end, another object of the invention is an exchanger thus defined, wherein the control system is of the pneumatic type.

To this end, another object of the invention is a turbomachine through which an air flow passes, a stator stage including guide vanes, with an exchanger thus defined, this exchanger including an exchange wall integrated into a casing of the turbomachine delimiting an air flow stream, this heat exchanger being located downstream of the stator.

DETAILED DISCLOSURE OF THE INVENTION

Figure 1:
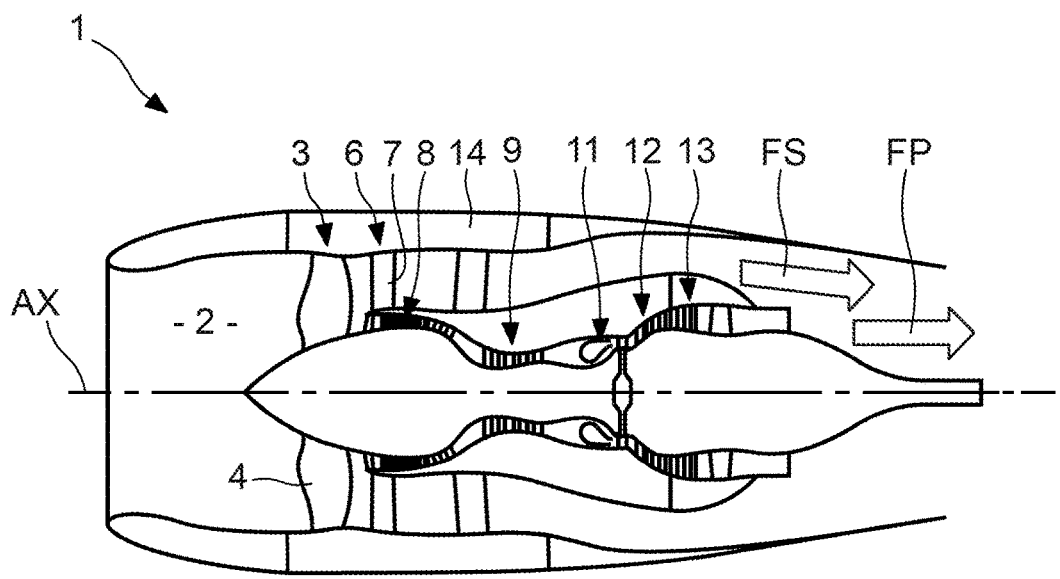
FIG. 1 is a longitudinal sectional view of a turbojet engine according to the invention.

In FIG. 1, an engine 1 includes an intake duct 2 through which the air is admitted to pass through a fan 3 including a series of rotary blades 4 followed by a stator 6 formed of guide vanes 7 before splitting into a central primary flow FP and a secondary air flow FS surrounding the primary flow.

The primary flow FP is compressed by low-pressure 8 and high-pressure 9 compressors before reaching a combustion chamber 11, after which it expands by passing through a high-pressure turbine 12 and a low-pressure turbine 13, before being released by generating an auxiliary thrust. The secondary flow FS is for its part propelled directly by the fan to generate a main thrust.

Each turbine 12, 13 includes series of vanes radially oriented and evenly spaced about a main axis AX, an outer casing 14 surrounding the whole engine.

The engine 1 integrates a circuit for circulating lubricating oil and/or for cooling its components, such as the bearings carrying its rotary elements or transmission members that this engine integrates. The cooling of this oil is ensured by the secondary flow that is cool, by means of a heat exchanger.

Figure 2:
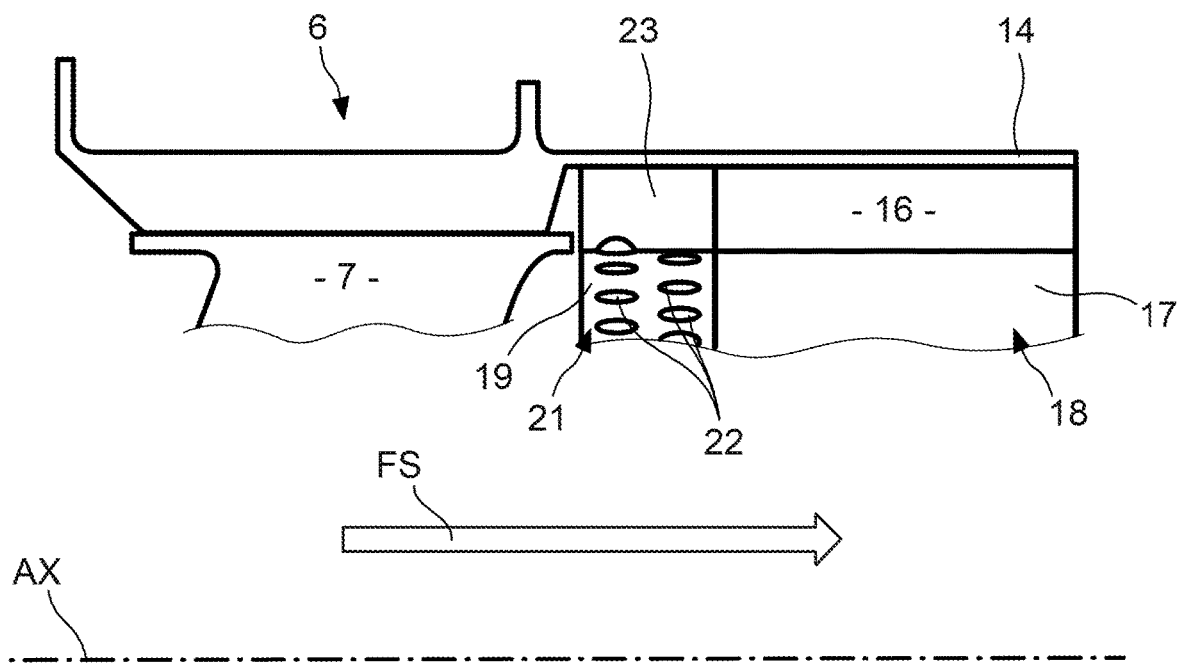
FIG. 2 is a local longitudinal sectional view of the turbojet engine according to the invention at a heat exchanger.

This exchanger, referenced by 16 in FIG. 2, is carried by an inner shell of the outer casing 14 substantially downstream of the guide vanes 7, and it includes a heat exchange wall 17 having a heat exchange surface 18, radially inner, which is bathed by the secondary flow FS in order to be cooled by it. This exchange surface 18 is advantageously devoid of any relief so as not to disrupt the secondary flow.

This exchanger 16 includes inner pipes not shown wherein the oil to be cooled circulates, and which are thermally connected to the wall 17 to cool the oil circulating in these pipes.

According to the invention, a baffle wall 19 is provided located in the extension of the heat exchange surface 18 of the exchanger, upstream of it in relation to the direction of circulation of the secondary flow FS. This baffle wall 19 locally introduces turbulences into the secondary flow FS that runs along it, in order to increase the efficiency of the heat exchange between this primary flow and the wall 17.

To this end, the baffle wall 19 includes an outer surface 21, which is provided with turbulence generators 22, of hollow shapes, making it possible to locally deviate the secondary flow in order to introduce therein turbulences. The flow then running along the exchange surface 18 is therefore turbulent, which significantly increases its heat exchanges with the surface 18, in order to cool the oil of the exchanger 16 more efficiently and without particularly disturbing the overall flow of the secondary flow FS.

In the example of the figures, the baffle wall 19 and its surface 21, radially inner, correspond to the wall and to the radially inner surface of an annular element 23 integrated into the casing 14. This annular element 23 is longitudinally interposed between the guide vanes 7 of the stator 6 and the exchanger 16, its surface 21 being located radially at the same level as the exchange surface 18.

Figure 3:
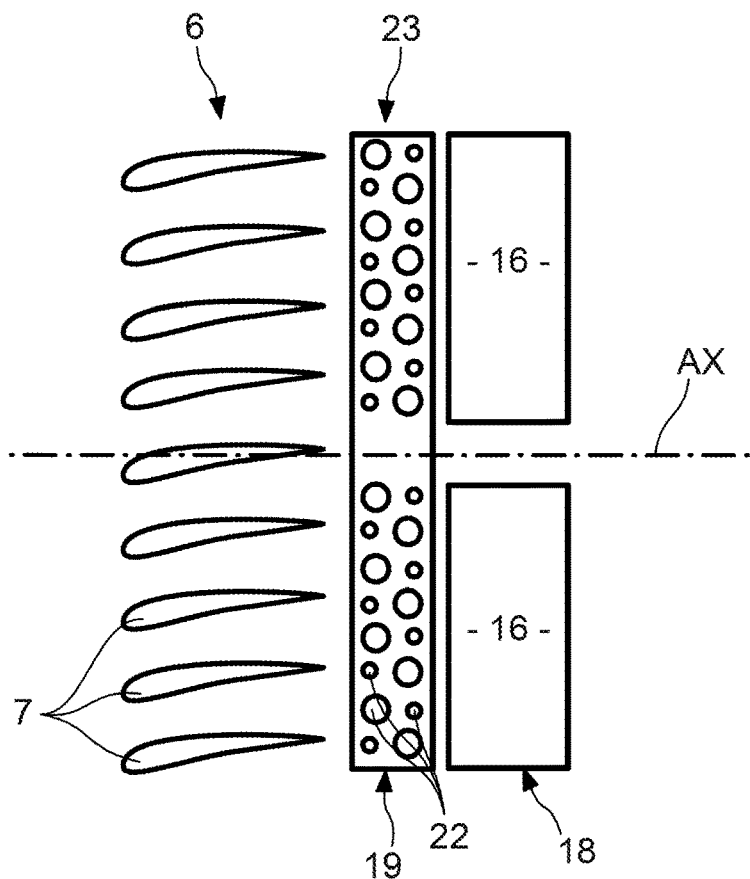
FIG. 3 is a local flat radial view of the turbojet engine according to the invention showing two heat exchangers mounted downstream of the fan stator.

As seen in FIG. 3, the engine 1 may include a plurality of heat exchangers 16 mounted on the inner circumference of the casing 14, by being circumferentially spaced apart from one another and located longitudinally immediately downstream of the annular element 23.

Figure 4:
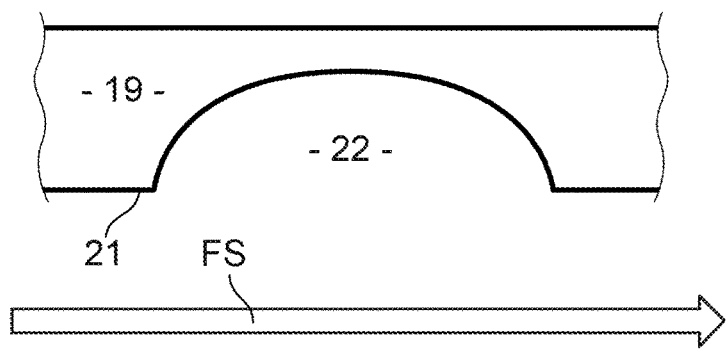
FIG. 4 is a longitudinal sectional view of a shape of hollow turbulence generator.

The turbulence generators 22 may be in the form of substantially hemispherical cavities, as schematically shown in FIG. 4, opening into the outer surface 21 by advantageously having different dimensions to maximise the turbulences that they introduce. Advantageously, a plurality of turbulence generators 22 are arranged one behind the other in the longitudinal direction.

Figure 5:
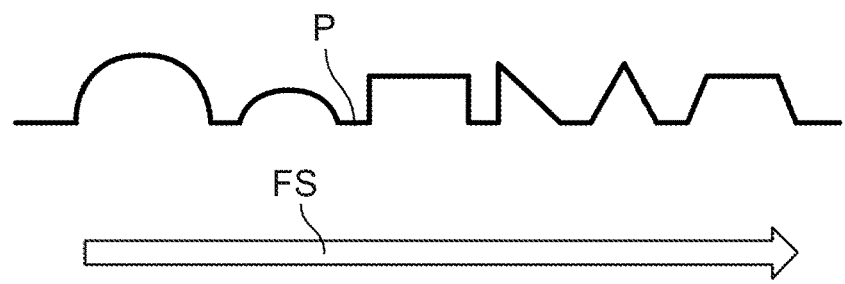
FIG. 5 is a schematic sectional view of a profile showing a plurality of examples of shapes of turbulence generators.

The turbulence generators 22 may also have hollow shapes other than the hemispherical shape, as schematically illustrated in FIG. 5, where a plurality of shapes have been shown within the same profile P. This may for example concern a pyramidal shape, a shape having in section in a plane passing through the axis AX a contour of the triangular, rectangular, square or also trapezoidal type.

Generally, the turbulence generators 22 radially have a height significantly less than the stream height in the radial direction. This height is the difference in radius between the inner surface of the casing 14, which externally delimits the secondary flow, and the outer surface of a casing internally delimiting the secondary flow. The length of these turbulence generators is for its part between one tenth and ten times this height.

Advantageously, the various turbulence generators 22 have different shapes and different dimensions, so as to increase the turbulence that they generate.

Figure 6:
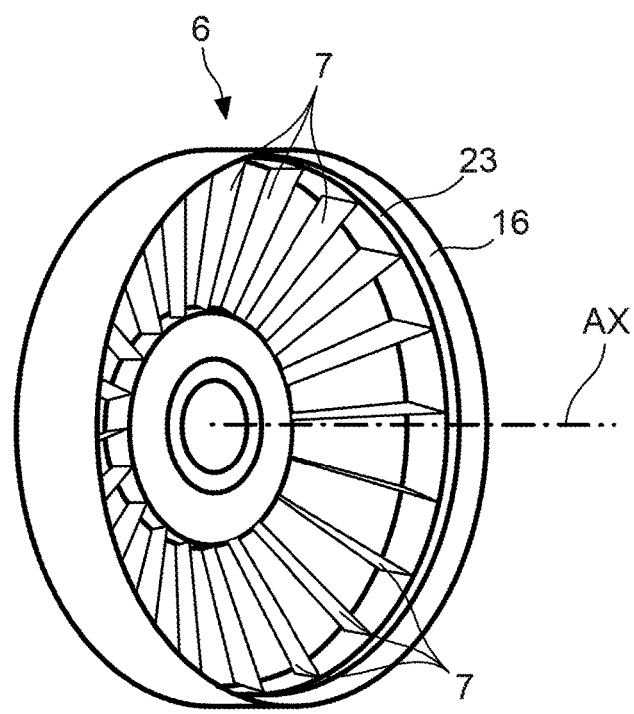
FIG. 6 is a perspective view showing a stator with its heat exchanger.
Figure 7:
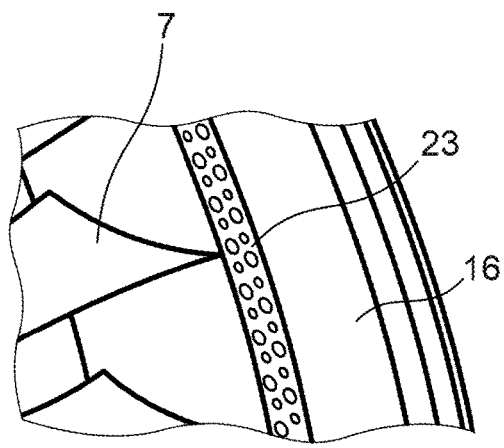
FIG. 7 is a perspective view locally showing a heat exchanger according to the invention mounted downstream of guide vanes.

As seen in FIGS. 6 and 7, the baffle wall 19 has a general cylindrical crown shape integrated into the inner surface of the casing 14, by being located longitudinally between the guide vanes 7 and the heat exchanger(s) 16.

Advantageously, the turbulence generators 22 are of the variable geometry type in order to be able to be activated or deactivated as required, which makes it possible to substantially eliminate the pressure loss when the required cooling is low or even zero, for example during cold weather.

Figure 8:
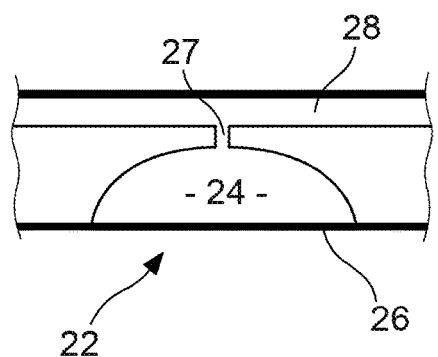
FIG. 8 is a schematic sectional view of a variable-geometry turbulence generator in the deactivated state.
Figure 9:
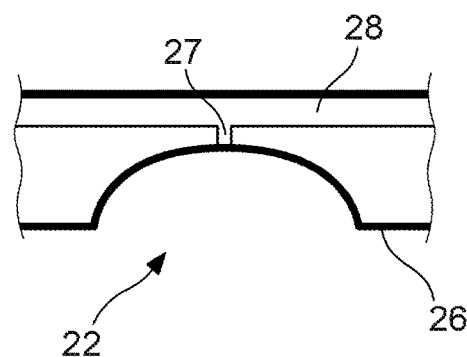
FIG. 9 is a schematic sectional view of a variable-geometry turbulence generator in the activated state.

As illustrated in FIG. 8, the turbulence generator 22 may then be formed from a baffle wall 19 including inner hemispherical cavities 24 opening into the outer surface 21, with an outer surface 21 in the form of a sealed and flexible membrane 26.

The enclosure delimited by the cavity 24 covered by the membrane 26 is substantially airtight, and the cavity 24 includes at its bottom a hole 27 passing through the wall 19 while being placed in communication with a pressurisation/depressurisation channel 28 running along the rear surface of the wall 19.

Thus, the turbulence generator 22 is in the inactive state when its cavity 24 is at ambient pressure, its membrane 26 then having a locally substantially flat shape: it does not define a hollow shape so as not to generate turbulences.

The activation of the turbulence generator 22 then consists in depressurising its cavity 24 by depressurising the channel 28, so that the membrane 26 then comes to contour the shape of this cavity to constitute a hollow portion generating turbulences at the secondary flow FS that runs along it.

The depressurisation may be generated by connecting the channel 28 to a region located upstream of the fan, where the pressure is lower than downstream of the guide vanes. A control system, of the active or passive control type may then be provided to activate or deactivate the turbulence generators 22 depending on whether the need for cooling is high or low.

Alternatively, when activating and deactivating the turbulence generators 22 by depressurising and pressurising the cavity 24, it is possible to provide a rod passing through the hole 27 in order to have its end secured to the membrane 26. This rod may then be electromagnetically controlled to be either pushed in order to align the membrane 26 with the inner surface in order to deactivate the generator 22, or to be pulled in order to press this membrane against the bottom of the cavity 24 in order to generate turbulences.

What is claimed is:

1. A heat exchanger between a fluid and an air flow, comprising a heat exchange wall separating the fluid and the air flow, the heat exchange wall including a heat exchange surface that extends parallel to a longitudinal direction of the air flow and with which the air flow is in contact, wherein the heat exchange surface is devoid of any relief, wherein the heat exchanger includes a baffle wall extending in the extension of the heat exchange wall and upstream of it in relation to the direction of circulation of the air flow, and wherein the baffle wall includes at least one turbulence generator of hollow shape in relation to the outer surface.

2. The heat exchanger according to claim 1, including at least one turbulence generator disposed at an upstream end of the baffle wall.

3. The heat exchanger according to claim 1, wherein the baffle wall includes a plurality of turbulence generators distributed in at least one direction perpendicular to the longitudinal direction.

4. The heat exchanger according to claim 2, including at least two adjacent turbulence generators having different shapes and/or dimensions.

5. The heat exchanger according to claim 1, wherein at least one turbulence generator has a variable geometry in relation to the outer surface, between a deactivated state wherein it is flush with the outer surface so as not to generate turbulences, and an activated state wherein it forms a hollow in relation to the outer surface to generate turbulences.

6. The heat exchanger according to claim 5, wherein the heat exchange wall includes inner cavities opening towards the outer surface and each corresponding to a turbulence generator, the outer surface including a sealed flexible membrane, the activation of a turbulence generator being obtained by depressurising the corresponding inner cavity.

7. The heat exchanger according to claim 6, integrating a control system configured to activate or deactivate the turbulence generators in relation to the outer surface.

8. The heat exchanger according to claim 7, wherein the control system is of the pneumatic type.

9. A turbomachine through which an air flow passes, a stator stage including guide vanes, with the heat exchanger according to claim 1, the heat exchanger including an exchange wall integrated into a casing of the turbomachine delimiting an air flow stream, the heat exchanger being located downstream of the stator.

* * * * *